United States Patent
Schätzler et al.

(10) Patent No.: US 6,682,291 B2
(45) Date of Patent: Jan. 27, 2004

(54) TRANSPORT DEVICE FOR LOADING AND UNLOADING A TRUNK SPACE

(75) Inventors: Walter Schätzler, Starnberg (DE); Manfred Pfalzgraf, Herrsching (DE)

(73) Assignee: Webasto Vehicle Systems International GmbH, Stockdorf (DE)

(*) Notice: Subject to any disclaimer, the term of this patent is extended or adjusted under 35 U.S.C. 154(b) by 64 days.

(21) Appl. No.: 09/986,993

(22) Filed: Nov. 13, 2001

(65) Prior Publication Data
US 2002/0076312 A1 Jun. 20, 2002

(30) Foreign Application Priority Data
Nov. 10, 2000 (DE) .......................... 100 55 826

(51) Int. Cl.[7] .............................. B65G 67/00
(52) U.S. Cl. ................ 414/462; 296/69; 414/528
(58) Field of Search ................ 296/24.1, 63, 65.1, 296/66, 69; 414/462, 527, 528

(56) References Cited

U.S. PATENT DOCUMENTS

| | | | |
|---|---|---|---|
| 1,704,841 A | 3/1929 | Sacerdote | 414/523 |
| 3,025,982 A * | 3/1962 | Quint | 414/528 |
| 4,941,797 A * | 7/1990 | Smillie, III | 414/462 |
| 6,244,645 B1 * | 6/2001 | Baumert et al. | 296/24.1 |

FOREIGN PATENT DOCUMENTS

| | | |
|---|---|---|
| DE | 37 40 300 | 10/1988 |
| DE | 196 19 126 | 11/1997 |
| DE | 197 09 114 | 9/1998 |
| DE | 199 04 714 | 8/2000 |
| FR | 2 579 941 | 10/1986 |
| GB | 814 714 | 6/1959 |

* cited by examiner

Primary Examiner—Janice L. Krizek
(74) Attorney, Agent, or Firm—Nixon Peabody LLP; David S. Safran

(57) ABSTRACT

A transport device for loading and unloading a trunk space of a motor vehicle is provided which includes at least one transport belt movably located on the bottom of the trunk space and at least two rollers for guiding the movable transport belt, wherein the at least one transport belt is located on the bottom of the trunk space and on a top surface of a vehicle part positioned adjacent to the bottom of the trunk space and capable of being pivoted into a horizontal position.

19 Claims, 2 Drawing Sheets

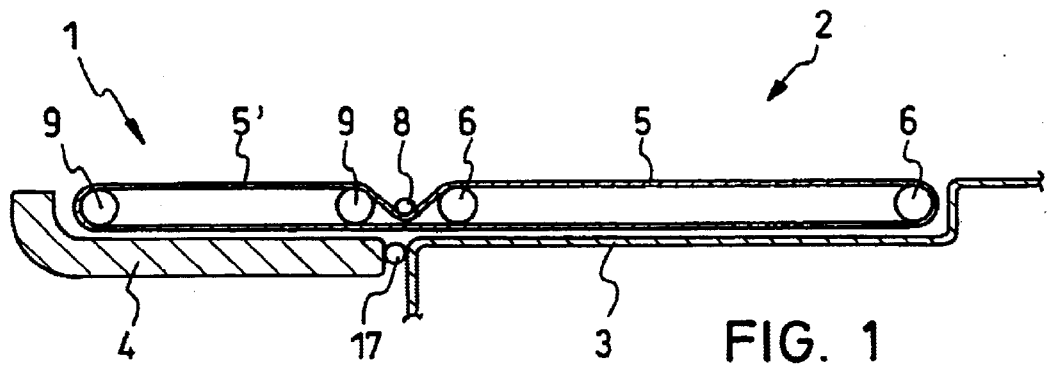
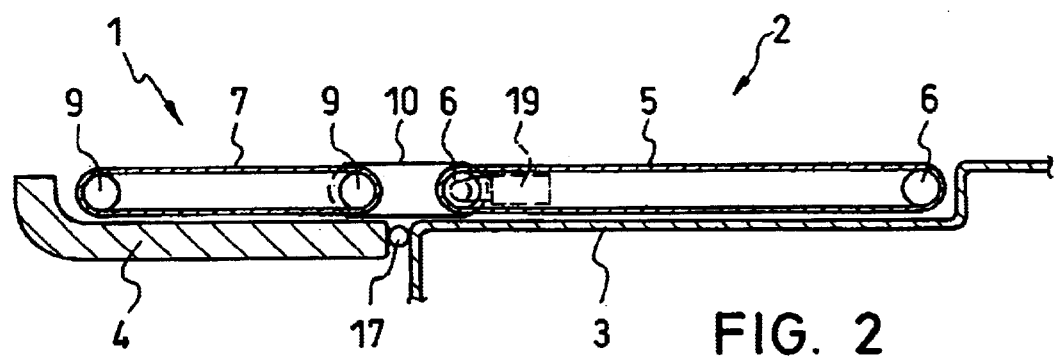

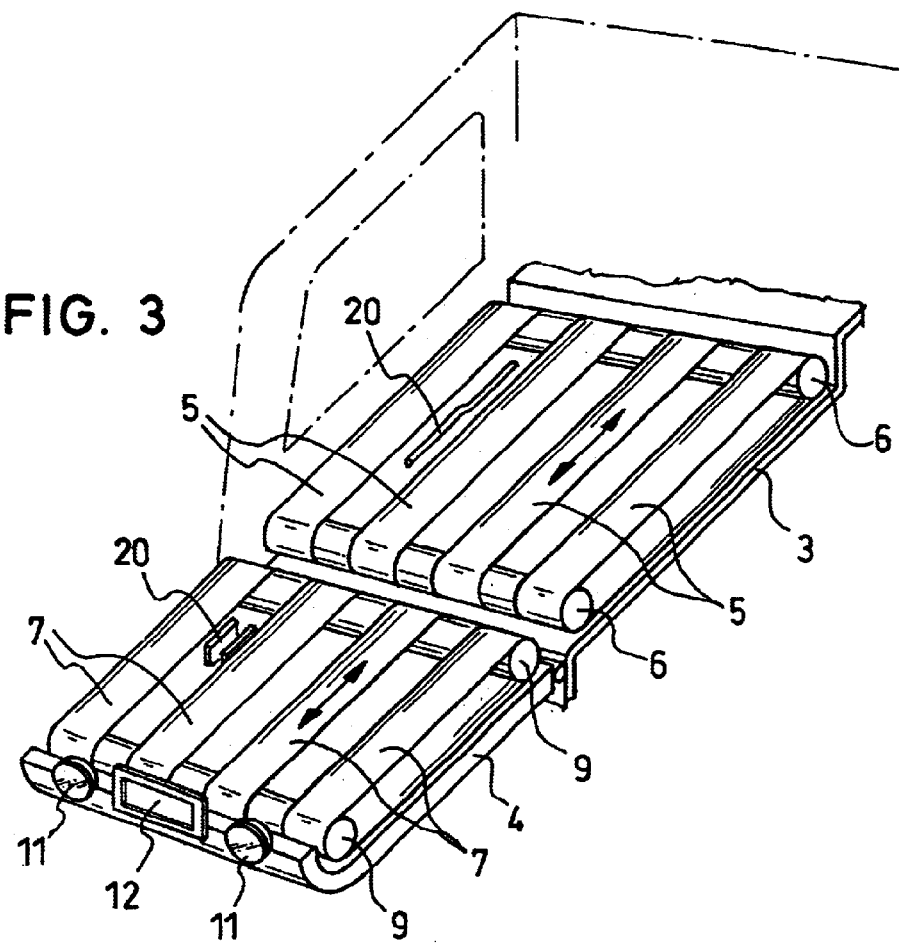
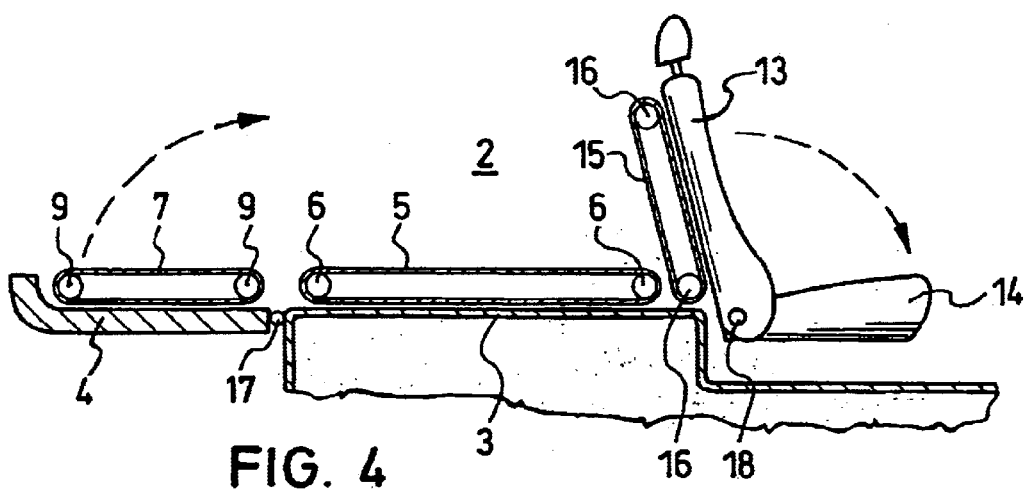

TRANSPORT DEVICE FOR LOADING AND UNLOADING A TRUNK SPACE

BACKGROUND Of THE INVENTION

1. Field of the Invention

The invention relates to a transport device for loading and unloading the trunk space of a motor vehicle, wherein the device comprises at least one transport belt which is movably located on the bottom of the trunk space and at least two rollers for guiding the transport belt which moves around the rollers.

2. Description of Related Art

A conventional transport device consisting of a transport belt which moves around two rollers is known from published German Patent Application DE 197 09 114 A1. These transport belts are designed for installation in the cargo space of a station wagon, a pickup, a bus, a truckster or a trailer to increase its cargo capacity and for easier loading and unloading of bulky cargo. One such one-piece transport belt, which is not equipped with deflection mechanisms, ends on the front and back termination of the cargo space, especially the floor of the cargo space. This results in the disadvantage that, for example, in motor vehicles with a tailgate which folds down, the cargo to be loaded must first be lifted over the area of the tailgate without the transport belt in order to reach the actual transport belt in the cargo space of the motor vehicle.

Published German Patent Application DE 199 04 714 A1 discloses a motor vehicle in which a transport belt is located on the bottom of the trunk space and another transport belt is located in the backrest of a seat which is located in front of the trunk space and which can be folded forward.

SUMMARY OF THE INVENTION

One object of the present invention is to overcome the disadvantages and shortcomings of the prior art.

Another object of the invention is to provide a transport device for loading and unloading the trunk space of a motor vehicle with expanded functionality.

The above objects along with other objects are achieved by providing a transport device for loading and unloading the trunk space of a motor vehicle having a vehicle part located adjacent the trunk space and capable of being pivoted into a horizontal position, comprising at least one transport belt movably located on a bottom of the trunk space and at least two rollers for guiding the at least one movable transport belt, wherein the at least one transport belt is located on the bottom of the trunk space and on a top surface of the vehicle part positioned adjacent to the bottom of the trunk space and capable of being swiveled.

By providing another transport belt on the top of a tailgate which is adjacent to the cargo surface and which can be swivelled into the horizontal position, the present invention advantageously provides an enlarged surface that can be used for comfortable loading and unloading and as a stowage space while driving. When the tailgate is opened down, the transport belt for loading the cargo can be easily reached since, as a result of the arrangement of the transport belt on the top of the tailgate, the transport belt can extend to the rear terminating edge of the tailgate and thus of the entire vehicle.

In a first embodiment, there is a common transport belt both on the floor of the trunk space and also on the top of the tailgate so that the two portions of the common transport belt lie in one plane when the tailgate is opened. This advantageously results in a construction which enables a smooth transition from the portion of the transport belt on the tailgate to the portion of the transport belt on the trunk floor.

In a second embodiment, in addition to the transport belt mounted on the trunk floor, there is a second transport belt on the top of the tailgate. This embodiment avoids the susceptibility to defects in the construction of the first embodiment, since two short transport belts are easier to manage than one long transport belt which must follow the swiveling of the tailgate when it is opened and closed.

Both the first embodiment with a continuous transport belt and also the second embodiment with separate transport belts can also be combined in conjunction with another transport belt which is located on the backrest of a seat which borders the cargo space. This additional transport belt can likewise be made as a separate transport belt or as a continuous transport belt in an extension of the transport belt which covers the floor of the cargo space. With the seat back folded down, loads located on the cargo bed can be moved forward more easily using the transport belt and also can be retrieved again.

To guide the transport belt or the transport belts, there are various rollers which can be elastically supported to advantageously tension the transport belt/transport belts and act as a part of the drive device for driving the transport belts.

By an arrangement of several transport belts, instead of one, which run parallel in one plane, it is possible to mount attachment means between the belts for fixing the cargo on the trunk bottom or on the inside of the tailgate and/or on the back of the pertinent seat back. Therefore, the transport belt(s) function of specifically facilitating loading and unloading of the cargo, is coupled to the function of the attachment means of specifically fixing the cargo within the trunk space.

By means of a license number plate located in the end area of the tailgate which is pivoted down, together with the tail lights, it is possible to move the motor vehicle in a manner safe for traffic even in the loaded state with the tailgate opened.

BRIEF DESCRIPTION OF THE DRAWINGS

FIG. 1 is a side cross sectional view of a first embodiment of the present invention with a continuous transport belt for the cargo space and tailgate;

FIG. 2 is a side cross sectional view of a second embodiment with separate transport belts for the cargo space and tailgate;

FIG. 3 is a perspective schematic representation of the second embodiment with an additional division into several parallel transport belts and holding devices located in between; and FIG. 4 shows a side cross sectional view of a third embodiment with an additional transport belt located on a seat back.

DETAILED DESCRIPTION OF THE INVENTION

FIG. 1 shows a first embodiment of the transport device 1 of the present invention. The trunk space 2 of a motor vehicle contains, on its bottom 3, a transport belt 5 with the pertinent rollers 6, around which the transport belt 5 moves on the bottom 3 of the trunk space. A tailgate 4, which can be pivoted down by means of two hinges 17 to open trunk space 2, has a portion 5' of the transport belt on its top when in the opened state. The portion 5' of the transport belt located on the tailgate 4 is directly connected to the transport belt 5 located on the bottom of the trunk. This portion 5' of the transport belt likewise turns around guide rollers 9 located in the area of the inside of the tailgate 4 to guide the transport belt.

An additional tension roller 8 performs the function of tensioning the transport belt via spring loading. At the same time, the tension roller 8 functions as the center of gravity, around which the transport belt is pivoted or placed when the tailgate is folded up.

FIG. 2 shows a second embodiment of the transport device of the present invention. The components which are identical in the two embodiments are labeled with the same reference numbers. On the trunk floor 3, a transport belt 5 with a guide roller 6 located front and back is attached. In contrast to the first embodiment, however, a second transport belt 7, which is separate from the first transport belt 5, is located on the top of the opened tailgate 4 with its own two rollers 9. The rollers 6, 9 facing one another on the side of the tailgate 4 and on the side of the trunk floor 3 are connected to one another by means of a connection device, for example a toothed belt 10, in order to synchronize the motion of the two transport belts with one another. In addition, the rollers 6, 9 can be driven to rotate by a drive means, for example, an electric motor 19, in order to facilitate continued motion of the cargo on the transport belts 5, 5' and 7.

One of the rollers 6, 9 can be elastically supported in the direction of increasing the axial distance from the other rollers in order to ensure continuous tensioning of the transport belt. As shown in FIG. 2, this elastic support may be achieved by a guide slot 22 for the axle of roller 6 and a spring 21 for prestressing the roller 6 in order to keep the belt in a properly tight condition.

As is apparent from FIGS. 1 and 2, the surfaces of the transport belts 5, 5' (FIG. 1) and belts 5, 7 (FIG. 2) are advantageously located horizontally in one plane with the tailgate 4 opened. But a transport belt tilted slightly toward the trunk space 2 on the tailgate 4 is conceivable in order to facilitate the delivery of cargo into the trunk space 2 as a result of the steep incline.

Referring to FIG. 3, by placing several parallel running transport belts on common or separate guide rollers, one or more attachment devices 20 can be located on or between the individual transport belts in order to attach bicycles which have been delivered via the transport belts. To ensure smooth functioning of the transport belts in the loaded state, sliding surfaces 21, for example, surfaces formed of sheet metal with a plastic slide coating, can be located between the rollers to support the transport belt or belts.

As shown in FIG. 3, a license plate 12 and pertinent vehicle tail lights 11 may be provided on the termination edge of the tailgate 4 for folding up and down with the tailgate 4. By the arrangement of one such folding license plate 12 with the pertinent tail lights 11, a traffic-safe motor vehicle is easily and promptly established even with the tailgate 4 opened in the loaded state.

FIG. 4 shows, as another option, another transport belt 15 with two rollers 16 mounted on the back of a backrest 13. When the backrest 13 is pivoted forward around a hinge 18 (in the direction of the arrow), the backrest 13 lies roughly horizontally over the seat surface 14. The surface of the transport belt 15 is thus preferably at the height of the transport belt 5 so that, if necessary, with the opened tailgate 4 pulled open, a continuous cargo surface is formed and extends over the transport belts 7, 5 and 15 to allow easy cargo loading and unloading.

To enable simple loading of the trunk space, the tailgate-side transport belt can be equipped with a braking device (not shown) and which can be locked and unlocked, for example, via a brake lever, acting on the rear roller. In this way, it is possible that during loading of the transport belt surface, for example, with bicycles, the transport belt surface does not move and thus optimum positioning of the bicycle on the transport belt surface is possible. Likewise the other transport belts 5 and 15 can be fixed by braking means.

The term "backrest" is defined both as the back of the front seat of a motor vehicle with only one row of seats and also the back of the rear seat when there are several rows of seats.

We claim:

1. A transport device for loading and unloading the trunk space of a motor vehicle having a vehicle part located adjacent the trunk space and capable of being pivoted into a horizontal position, comprising:
   at least one transport belt located on a bottom of the trunk space;
   at least two rollers for guiding the at least one transport belt; and
   wherein the vehicle part is a tailgate, said at least one transport belt including a first transport belt located on the bottom of the trunk space of the motor vehicle, said first transport belt including a continuous extension extending over the top surface of the tailgate when the tailgate is in an opened state.

2. The transport device of claim 1, wherein said first transport belt including said continuous extension is located in one plane when the tailgate is in the opened state.

3. The transport device of claim 1, further including at least two additional rollers for guiding said continuous extension of said first transport belt extending over the top surface of the tailgate.

4. The transport device of claim 1, further including a drive device for driving and rotating at least one of the rollers.

5. The transport device of claim 1, wherein the vehicle part is a backrest, and wherein a backrest transport belt is located on top of the backrest of the motor vehicle with the backrest folded forward.

6. The transport device of claim 5, wherein said first transport belt and said backrest transport belt are located in one plane when the backrest is folded forward.

7. The transport device of claim 1, wherein said at least one transport belt comprises at least two parallel transport belts which run next to one another in one plane.

8. The transport device of claim 7, wherein the at least two parallel transport belts are spaced apart, further including attachment devices located on or between the at least two parallel transport belts.

9. A transport device for loading and unloading the trunk space of a motor vehicle having a vehicle part located adjacent the trunk space and capable of being pivoted into a horizontal position, comprising:
   at least one transport belt;
   at least two rollers for guiding the at least one transport belt; and
   wherein the vehicle part is a tailgate, said at least one transport belt including a first transport belt located on the bottom of the trunk space of the motor vehicle and a second transport belt separate from said first transport belt extending over the top surface of the tailgate when the tailgate is in an opened state.

10. The transport device of claim 9, wherein said first transport belt and said second transport belt are located in one plane when the tailgate is in the opened state.

11. The transport device of claim 9, further including at least two additional rollers for guiding said second transport belt located on the tailgate.

12. A transport device for loading and unloading the trunk space of a motor vehicle having a vehicle part located adjacent the trunk space and capable of being pivoted into a horizontal position, comprising:

at least one transport belt located on a bottom of the trunk space;

at least two rollers for guiding the at least one transport belt;

wherein the vehicle part is a backrest, said at least one transport belt including a first transport belt located on the bottom of the trunk space of the motor vehicle and wherein a backrest transport belt is located on top of the backrest of the motor vehicle with the backrest folded forward, and further including at least two backrest rollers for guiding said backrest transport belt located on the backrest.

13. A transport device for loading and unloading the trunk space of a motor vehicle having a vehicle part located adjacent the trunk space and capable of being pivoted into a horizontal position, comprising:

at least one transport belt;

at least two rollers for guiding the at least one transport belt;

wherein said at least one transport belt is located on the bottom of the trunk space and on a top surface of the vehicle part positioned adjacent to the bottom of the trunk space and is capable of being swiveled; and further including sliding surfaces positioned between said at least two rollers.

14. The transport device of claim 13, wherein the sliding surfaces are formed from sheet metal with plastic slide coatings.

15. A transport device for loading and unloading the trunk space of a motor vehicle having a vehicle part located adjacent the trunk space and capable of being pivoted into a horizontal position, comprising:

at least one transport belt;

at least two rollers for guiding the at least one movable transport belt;

wherein said at least one transport belt is located on the bottom of the trunk space and on a top surface of the vehicle part positioned adjacent to the bottom of the trunk space and is capable of being swiveled; and further including a support device for elastically supporting one roller in a direction of increasing an axial distance to another roller.

16. A transport device for loading and unloading the trunk space of a motor vehicle having a vehicle part located adjacent the trunk space and capable of being pivoted into a horizontal position, comprising:

at least one transport belt;

at least two rollers for guiding the at least one transport belt;

wherein the vehicle part is a backrest, said at least one transport belt including a first transport belt located on the bottom of the trunk space of the motor vehicle and wherein a backrest transport belt is located on top of the backrest of the motor vehicle with the backrest folded forward, and wherein said backrest transport belt comprises at least two parallel transport belts which run next to one another in one plane.

17. A transport device for loading and unloading the trunk space of a motor vehicle having a vehicle part located adjacent the trunk space and capable of being pivoted into a horizontal position, comprising:

at least one transport belt;

at least two rollers located on the bottom of the trunk space for guiding the at least one movable transport belt;

wherein said at least one transport belt is located on the bottom of the trunk space and on a top surface of the vehicle part positioned adjacent to the bottom of the trunk space and is capable of being swiveled; and further including at least two additional rollers on the adjacent vehicle part, at least one of the at least two rollers located on the bottom of the trunk space and at least one of the at least two additional rollers located on the adjacent vehicle part being connected via at least one toothed belt.

18. A transport device for loading and unloading the trunk space of a motor vehicle having a vehicle part located adjacent the trunk space and capable of being pivoted into a horizontal position, comprising:

at least one transport belt;

at least two rollers for guiding the at least one movable transport belt;

wherein said at least one transport belt is located on the bottom of the trunk space and on a top surface of the vehicle part positioned adjacent to the bottom of the trunk space and is capable of being swiveled; and further including a pretensioning roller positioned adjacent said at least one transport belt.

19. A transport device for loading and unloading the trunk space of a motor vehicle having a vehicle part located adjacent the trunk space and capable of being pivoted into a horizontal position, comprising:

at least one transport belt;

at least two rollers for guiding the at least one movable transport belt;

wherein said at least one transport belt is located on the bottom of the trunk space and on a top surface of the vehicle part positioned adjacent to the bottom of the trunk space and is capable of being swiveled; and wherein said vehicle part is a tailgate capable of being folded down, further including at least one of a folding license plate and a folding tail light mounted in a gate-side end area of the transport device.

* * * * *